(12) United States Patent
Curtis et al.

(10) Patent No.: US 10,038,173 B2
(45) Date of Patent: Jul. 31, 2018

(54) EXTRUDED BATTERY ENCLOSURE JOINT CONFIGURATION

(71) Applicant: GM Global Technology Operations LLC, Detroit, MI (US)

(72) Inventors: Randy C. Curtis, Macomb, MI (US); Randall S. Champagne, Riverview, MI (US); Duane D. Kruger, Washington, MI (US); Stephen L. Gross, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 14/987,898

(22) Filed: Jan. 5, 2016

(65) Prior Publication Data
US 2017/0194609 A1    Jul. 6, 2017

(51) Int. Cl.
*H01M 2/10*    (2006.01)

(52) U.S. Cl.
CPC ...... *H01M 2/1077* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 3,315,834 A * | 4/1967 | Nemlich | A47B 88/9416 220/4.01 |
| 3,605,534 A * | 9/1971 | Barr | B26D 3/02 409/304 |
| 3,612,639 A * | 10/1971 | Williams | A47B 88/9416 312/257.1 |
| 6,056,840 A * | 5/2000 | Mills | B29C 53/063 156/217 |
| 6,309,039 B1 * | 10/2001 | Park | A47B 96/202 229/931 |
| 8,919,082 B1 * | 12/2014 | Cataldo | B65D 81/3816 220/4.29 |

(Continued)

FOREIGN PATENT DOCUMENTS

| | | | | |
|---|---|---|---|---|
| WO | WO 2013/124047 | * | 8/2013 | B29C 53/06 |
| WO | WO 2014/026793 | * | 2/2014 | H01M 2/02 |

*Primary Examiner* — Ula C Ruddock
*Assistant Examiner* — Amanda Barrow
(74) *Attorney, Agent, or Firm* — Quinn IP Law

(57) ABSTRACT

An automotive battery pack enclosure, assembly and method of housing battery pack cells within an enclosure. The enclosure includes a tray that defines a mounting surface for the various individual battery cells, as well as an upstanding wall, while the assembly further includes numerous individual battery cells aligned along a stacking axis within the enclosure. The wall is made from a continuous extruded preform with periodically-spaced miters that permit bending such that the wall can assume any shape defined by the various panels. The panels cooperative with the peripheral edges of the tray to define a battery container with a footprint shape generally similar to that of the tray. By being formed from a substantially one-piece preform, all of the corners—save the one formed where wall ends are brought into adjacent cooperation with one another—define a continuous structural seal without the need for sealants, welds or other supplemental closure approaches.

18 Claims, 7 Drawing Sheets

(56) References Cited

U.S. PATENT DOCUMENTS

2013/0071699 A1* 3/2013 Heise ................ H01M 10/5004
                                                      429/50
2015/0214570 A1* 7/2015 Deponte ........... H01M 10/0481
                                                      429/99
2015/0321785 A1* 11/2015 Smith .................... B65D 5/029
                                                      229/109

* cited by examiner

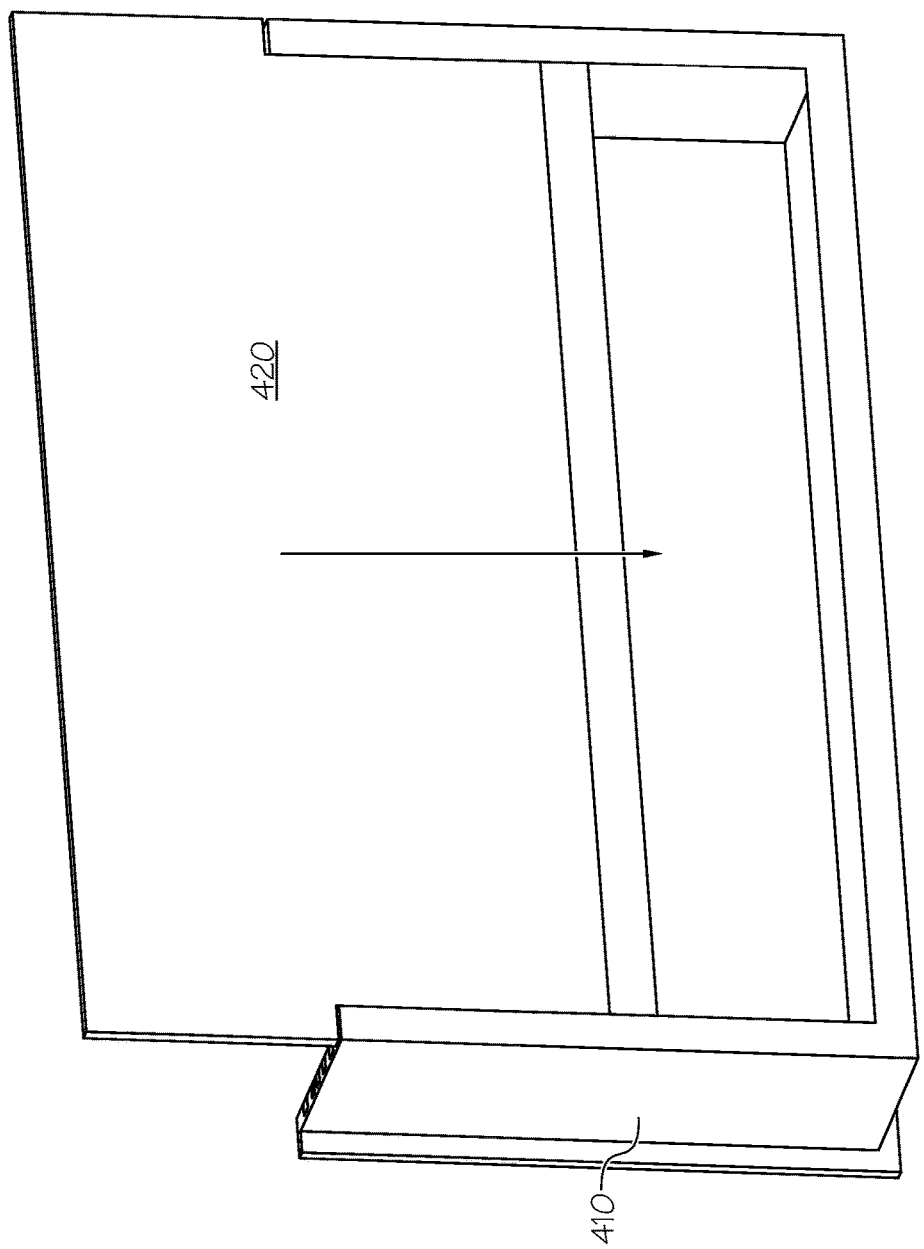

EXTRUDED BATTERY ENCLOSURE JOINT CONFIGURATION

BACKGROUND OF THE INVENTION

This invention relates generally to the containment of individual battery cells that make up a vehicular battery pack, and more particularly to the use of extruded components that make up at least portions of a battery enclosure to promote sealed containment of the individual battery cells.

Lithium-ion and related batteries are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. In one form suitable for automotive applications, individual battery cells are combined into larger assemblies such that the current or voltage is increased to generate the desired power output. In the present context, larger module and pack assemblies are made up of one or more cells joined in series, parallel or both, and include additional structure to ensure proper installation into the vehicle. Although the term "battery pack" is used herein to discuss a substantially complete battery assembly for use in propulsive power applications, it will be understood by those skilled in the art that related terms—such as "battery unit" or the like—may also be used to describe such an assembly, and that either term may be used interchangeably without a loss in such understanding.

In one form, the individual cells that make up a battery pack may be configured as rectangular (i.e., prismatic) cans that define a rigid outer housing known as a cell case. In another form, the individual cells may be housed in a thinner, flexible rectangular pouch. Both variants can be placed in a facing arrangement (much like a deck of cards) along a stacking axis formed by the aligned parallel plate-like surfaces. Positive and negative terminals situated on one or more edges on the exterior of the cell housing are laterally-spaced from one another relative to the stacking axis and act as electrical contacts for connection (via busbar, for example) to an outside load or circuit. Regardless of which variant is employed, design goals associated with the enclosure used to contain the stacked individual cells include its ability to provide secure attachment to and containment within the corresponding vehicle compartment, as well as some degree of sealed gaseous, liquid, thermal and electrical isolation from the ambient environment. Traditionally, this has necessitated the use of enclosure assemblies that are complex and expensive, especially as it relates to reducing or eliminating enclosure joints that are incompatible with such goals. Examples of such complex or expensive enclosures include those constructed through welding, bonding or riveting of steel-based components, while others used simple plastics that make it difficult to maintain battery dimensional quality and durability or composites that involve expensive materials and fabricating techniques.

SUMMARY OF THE INVENTION

The invention disclosed herein provides a novel way to eliminate a joint between two adjacent vertical panels used to form an enclosure or related housing for stacked prismatic battery cells, whether in either can or pouch form. In accordance with the teachings of the present invention, a design for securing one or more such cells into a larger battery assembly (such as a battery module or a battery pack) is disclosed. Likewise, an assembly of components for a battery pack used for vehicular applications may include—in addition to numerous battery cells contained within the enclosure—cooling, securing, electrical connectivity, control and monitoring, as well other equipment that, while not contributing to the production of electric power, form an important part of the overall battery system packaging and assembly.

According to an aspect of the present invention, an automotive battery pack assembly is disclosed that includes numerous prismatic battery cells at least some of which are aligned along a stacking axis, and an enclosure to house or otherwise contain the cells. The enclosure is made up of a tray defining a mounting surface, as well as an upstanding wall cooperative with the tray. The wall includes panels that are formed along tray peripheral edges, where each of the panels are formed from an extruded preform that can be bent at select mitered locations such that the intersection joining two adjacent panels forms a sealed corner at the miter. In addition, grooves that may be formed in a lower portion of each panel permit a slide-in engagement of the generally planar tray. In one form, the numerous batteries may be grouped into larger (generally box-shaped) battery modules such that one or more of such modules may be housed within the enclosure in a manner to best take advantage of the footprint defined by such enclosure. Moreover, the footprint can be formed into any shape where continuous mitered bends may be created as a way to better accommodate the respective number of modules, including those with varied stacking orientations. Thus, because efficient placement of such battery modules is important, the stacking axis may be made to substantially coincide with the support surface's elongate dimension for one module, while another module can be arranged such that the stacking axis substantially coincides with the support surface widthwise dimension, as well as combinations therebetween.

According to another aspect of the present invention, a battery pack enclosure includes a tray defining a mounting surface, as well as an upstanding wall with periodically-spaced miters that define a plurality of panels in a manner similar to that of the previous aspect.

According to yet another aspect of the invention, a method of assembling an automotive battery pack is disclosed.

BRIEF DESCRIPTION OF THE DRAWINGS

The following detailed description of the preferred embodiments of the present invention can be best understood when read in conjunction with the following drawings, where like structure is indicated with like reference numerals and in which:

FIG. 9 shows the slide-in attachment of the tray to the wall through aligned grooves formed in the various panels.

DETAILED DESCRIPTION OF THE PREFERRED EMBODIMENTS

Figure 1:
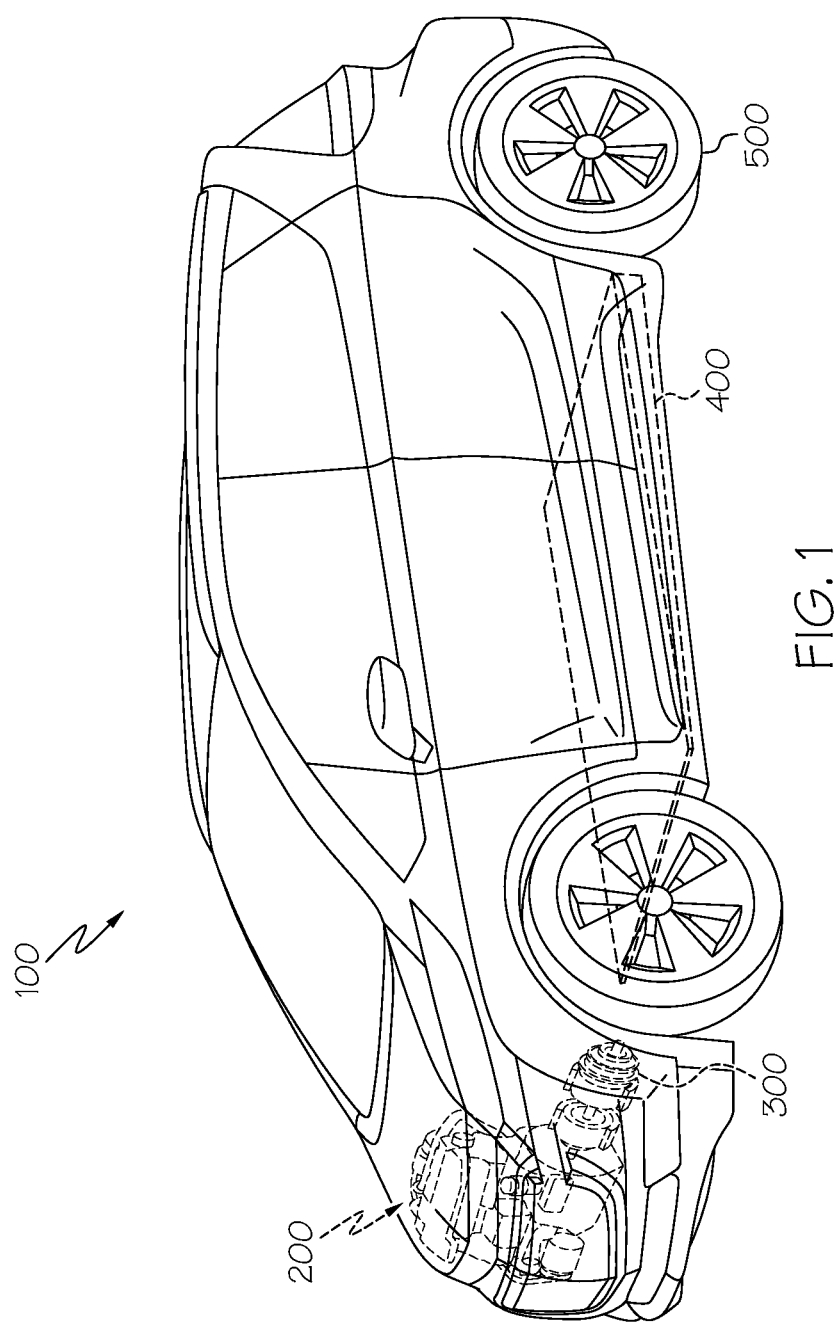
FIG. 1 shows a vehicle with a hybrid propulsion system in the form of a battery pack and an internal combustion engine.
Figure 2A:
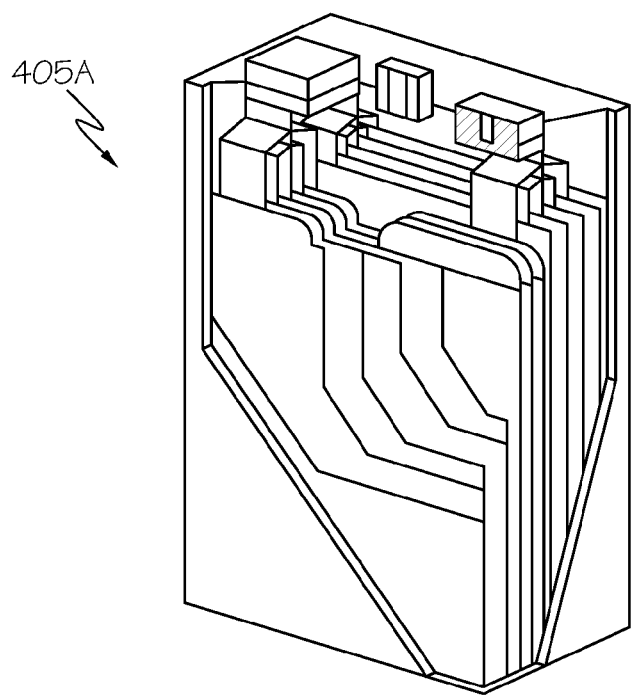
FIGS. 2A and 2B show notional battery cells configured as a prismatic can (FIG. 2A) and prismatic pouch (FIG. 2B) that can be placed within a battery enclosure according to the present invention.
Figure 2B:
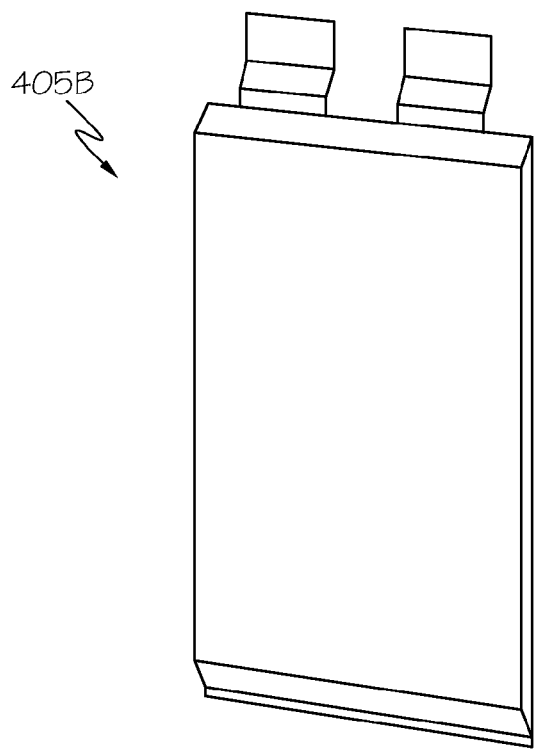

Referring first to FIGS. 1, 2A and 2B, views of a hybrid-powered vehicle 100 with a notional battery pack 400 used to propel vehicle 100 is shown. Within the present context, it will be appreciated that the term "vehicle" may apply to car, truck, van, sport utility vehicle (SUV) or the like, as well as motorcycle, aircraft or watercraft that is powered by one or more battery packs 400. In addition to the battery pack 400, vehicle 100 includes an ICE 200, one or more electric motors 300 and as well as an electronic control system (not shown). Vehicle 100 further includes a powertrain (not shown, which could be in the form of a driveshaft or the like) to deliver propulsive power from the ICE 200, motor/generator 300 or battery pack 400 to one or more of the wheels 500. Battery pack 400 may additionally include a state of charge (SOC) system and power inverter assembly (neither of which are shown), as well as other conductive elements configured to provide a pathway for current flow between these and other associated battery-related electronic components. Although the battery pack 400 is shown in the lower central and rear of vehicle 100, it may be located in any suitable location to facilitate a preferred degree of electrical coupling, structural integration or the like. In one embodiment, battery pack 400 is an assembly made up of numerous lithium ion (Li-ion) cells in can form 405A (FIG. 2A) and pouch form 405B (FIG. 2B); collectively, these individual cells are referred to as cells 405. In one form, larger modules (not shown) that are made from stacking and grouping numerous of cells 405 along may be configured such that a stacking axis of at least a portion of the cells 405 is substantially parallel to an elongate (i.e., lengthwise) dimension of the vehicle 100, while in others, the stacking axis may be such that the modules and cells 405 contained therein are substantially parallel to a widthwise dimension of the vehicle 100, and still another form one or more of the modules and cells 405 can be arranged lengthwise while one or more are arranged widthwise; all variants are deemed to be within the scope of the present invention. It will likewise be appreciated by those skilled in the art that while vehicle 100 is presently shown as a hybrid-powered vehicle, one with purely electric power (i.e., one with no need for ICE 200) is also deemed to be within the scope of the present invention.

One common vehicular form of the battery pack 400 being investigated by the Assignee of the present invention is known as a power battery, while another is known as an energy battery. Both variants can include having various modules or related sub-units be placed in various orientations within the battery pack 400, while the number of individual cells 405 that correspond to each module are placed in a facing arrangement (much like a deck of cards) along a stacking axis formed by their aligned plate-like surfaces. In either can or pouch form, positive and negative terminals (or tabs) extend outward from one or more edges of the cells 405 to act as contacts for connection of the internally-generated electrical current to a busbar, cabling or related common circuit. Regardless of which variant is employed, the enclosure 410 used for the stacked individual cells 405 needs to provide secure attachment to and containment within the corresponding vehicle 100 compartment, as well as provide proper electrical connectivity between the cells 405 and the power-consuming electrical loads within the vehicle 100, as well as suitable heat-management flowpaths and environmental isolation.

Figure 3:
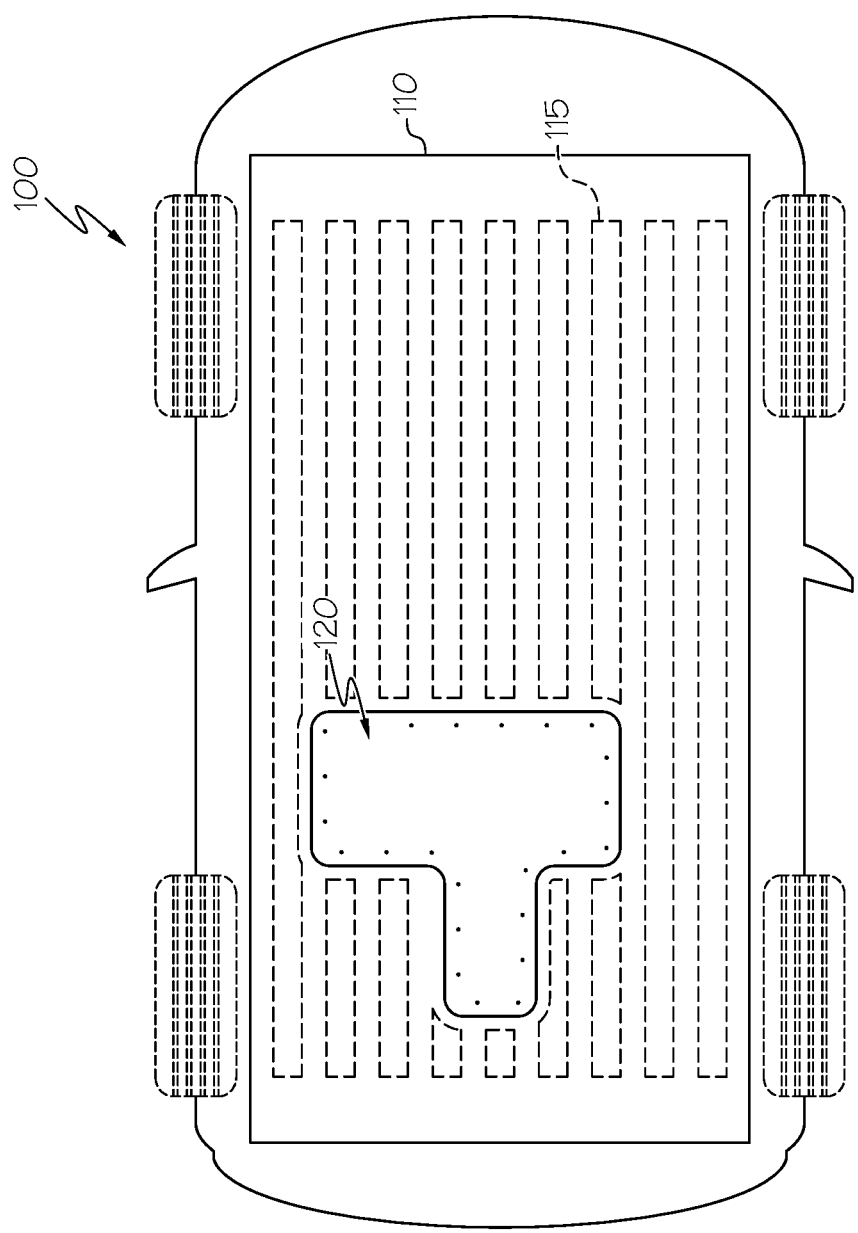
FIG. 3 shows an underside view of the vehicle of FIG. 1, including a notional placement of the battery pack according to one aspect of the present invention.
Figure 4:
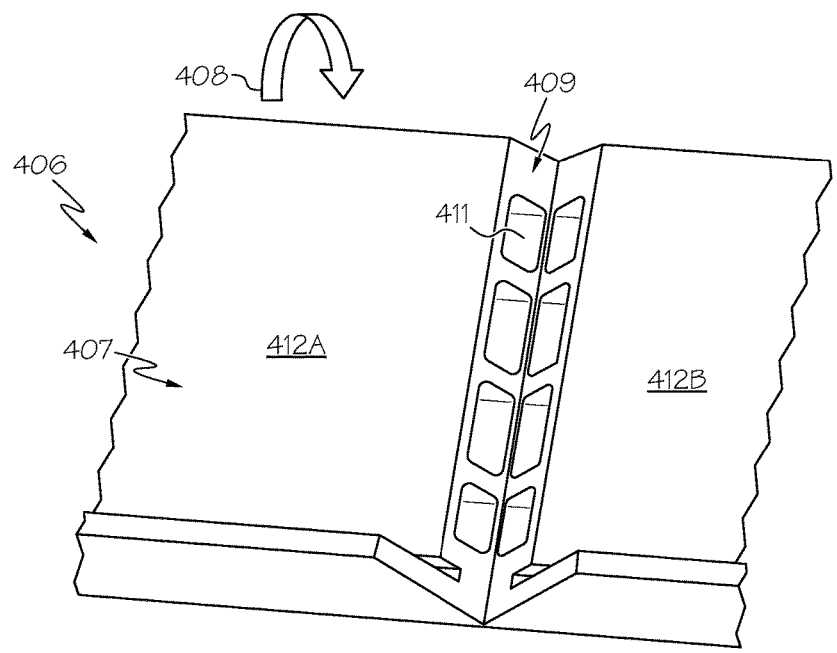
FIG. 4 shows details associated with a V-shaped miter being formed across a substantially continuous extrusion preform.
Figure 5:
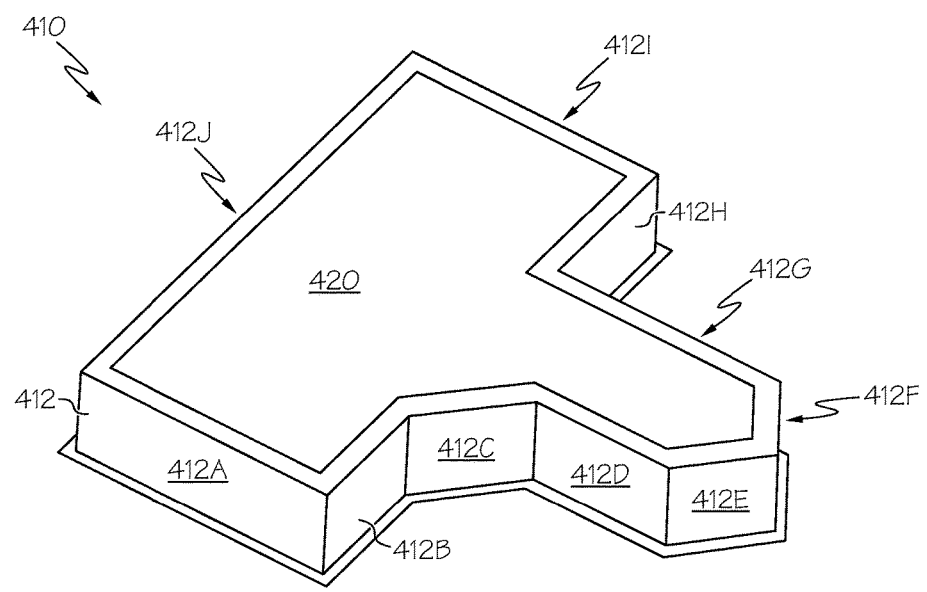
FIG. 5 shows a simplified bottom perspective view of a battery enclosure with a compound-shaped wall.

Referring next to FIGS. 3, 4 and 5, the underside of the vehicle 100 includes a chassis-like substructure 110 to which numerous automotive components may be mounted or otherwise secured. Such substructure 110 may be formed from stamped metal to include indentations, ridges or related undulations 115 as a way to define a seating area for various components; one such seating area 120 is sized and shaped to accommodate the enclosure 410 of the present invention that is shown with particularity in FIG. 5 and may form the housing for battery pack 400.

As shown with particularity in FIGS. 4 and 5, a portion of a generally planar elongate preform 406 with opposing planar surfaces 407 and 408 is used to form the walls 412 of the enclosure 410. In a preferred embodiment, the preform 406 may be fabricated by a continuous manufacturing approach such as extrusion where relatively lightweight materials such as aluminum-based ones, rigid, structurally-capable plastic-based ones or the like may be used. A series of generally V-shaped miters 409 are formed across the width and along the length of the preform 406 to permit inward bending of one of the surfaces (for example, surface 407 as shown) toward one another around a pivot point defined by the center of the miter 409. In this way, panels 412A, 412B . . . 4126J (such as presently shown in FIG. 5) may be defined as the generally planar wall 412 sections between successive miters 409. Additional notches (not shown) may be formed along the length of the bottom of the miter 409 in order to avoid an interference fit when adjacent panels (for example, panels 412A and 412B) are folded toward one another at a 90° or greater angle. By constructing a substantial entirety of the upstanding wall 412 from a single piece of extruded material, inherent corner sealing is created, as the continuous nature of its structure (even at the joints formed by the miters 409) ensures that no seams or gaps are present. In fact, properly constructed, the enclosure 410 would only leave one joined corner in need of supplemental sealing by welding, elastomeric seal beads or the like. By significantly reducing the number of locations where such time-consuming, expensive sealing steps are required, improvements in overall battery pack 400 assembly may be realized. In fact, sealing the sole non-continuous corner—which coincides with the adjacent connection of the two opposing ends of preform 406—also reduced the need for separate joining operations that would otherwise further complicate the assembly process.

Because the preform 406 is made from an extrusion, optional elongate channels 411 may be formed in the space between the two opposing planar surfaces 407 and 408; such channels 411 serve as a useful way to reduce enclosure 410 weight in configurations where the preform 406 is relatively thick. Channels 411 may also be used to convey coolant or related fluids in configurations where temperatures (such as those generated by battery pack 400) may need to be controlled. It will be appreciated by those skilled in the art that the number of panels will vary according to the footprint defined by the wall 412 that is formed out of preform 406; thus, in a configuration where the enclosure 410 is a simple box (i.e., substantially rectangular in shape), there will be four such panels (for example, 4126A through 412D) joined together with substantially 90° angles formed at each corner. Significantly, FIG. 5 emphasizes that the enclosure 410 need not define such a rectangular profile, and may include numerous surfaces for each of its panels 412A through 412J arranged to provide the enclosure 410 with a compound shape. In fact, the number of panels 412A through 412J—as well as the exterior footprint of the wall 412—is limited only by the number and placement (the latter to permit both inside-facing angle bends and outside-facing angle bends) of the miters 409, as continuous bends may be formed at each miter 409 in order to arrive at the final exterior profile of the wall 412. The continuous nature of the preform 406 is such that panels 412A through 412J formed therefrom inherently possess material continuity through the thickness or width of the various formed panels 412A through 412J. As such, a sealed corner is created by virtue of this continuity of structure with this joint style. Moreover, while the angular relationship between most of the adjacently-joined panels shown in FIG. 5 defines a 90° joining, it can be seen in looking at the coupling between panels 412B and 412C, 412C and 412D, 412D and 412E, 412E and 412F, 412F and 412G that other angular variations may be created in situations where the enclosure 410 is defining a non-rectangular portion. In fact, by having the miters 409 alternately placed on one or the other of surfaces 407, 408, an enclosure 410 as shown defining a compound-shaped footprint may readily be formed. In addition to the wall 412, enclosure 410 includes a substantially planar tray 420 that forms the support surface on which the individual battery cells 405 rest.

Figure 6:
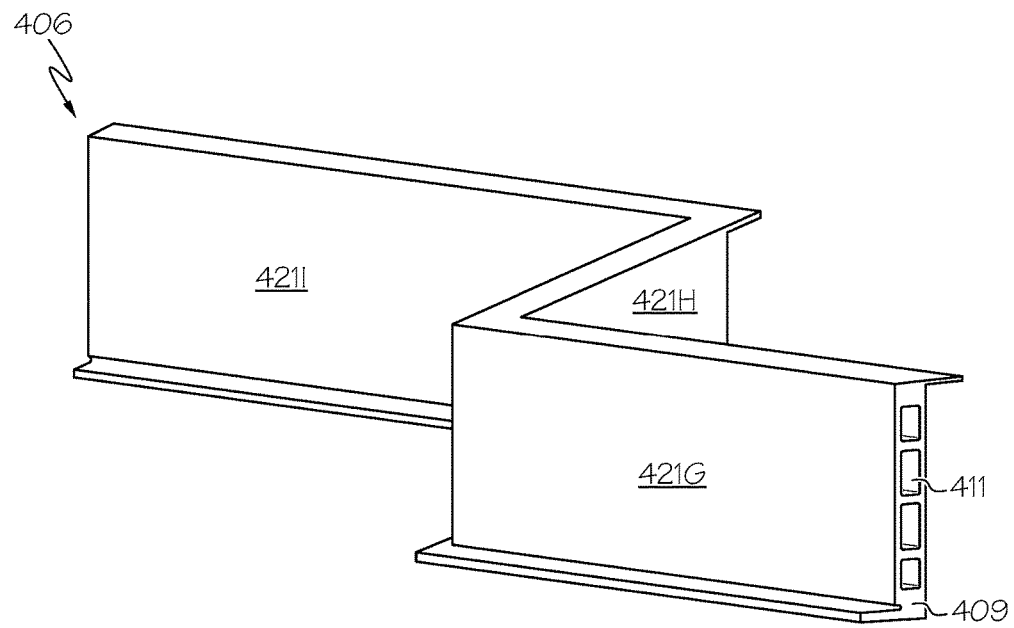
FIG. 6 shows how a series of panels from the preform of FIG. 4 may be arranged to define a portion of the compound wall shape for the battery enclosure of FIG. 5.
Figure 7:
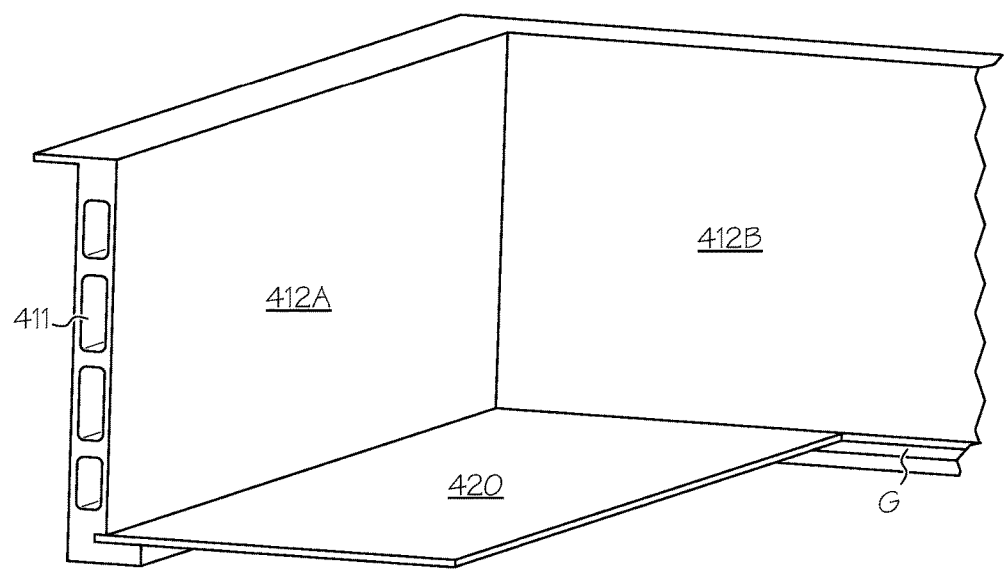
FIG. 7 shows the continuous 90° angle cooperation of two adjacent panels from the preform of FIG. 4 that make up a portion of the wall, as well as a slide-in placement of a tray that together may be used as the battery enclosure for the cells of FIG. 2A or 2B.

FIGS. 6 and 7 further emphasize how a single generally planar extruded wall preform 406 can be manipulated into various corner shapes at the miters 409. FIG. 6 shows with particularity how alternating placement of the miters 409 promotes the formation of various inward and outward bends of preform 406 to create panels 412G, 412H and 412I of the wall 412 of the enclosure 410 of FIG. 5. FIG. 7 shows with particularity how grooves G may be formed in the surface 407, 408 of preform 406 such that upon bending the preform into various panels (such as panels 412A, 412B as shown), the tray 420 (which has comparably-sized peripheral edges) may be slidably engaged with the various panels 412A, 412B at the grooves G. In a preferred form grooves G are situated at or near the portion of the preform 406 that will upon forming define the bottom of the wall 412. Preferably, the grooves G of the various panels align such that they define a substantially common plane as a way to promote the slide-in slotted connection between the generally planar tray 420 and the wall 412. In another form (not shown), the tray 420 may be affixed onto the bottom surface of the wall 412, thereby obviating the need for grooves G. Nevertheless, the present inventors have determined that the grooves G are advantageous in that they can help promote better sealing of enclosure 410 in that the walls 412 and tray 420 can be more easily sealed with the overlapping, interference-like fit that a groove G affords.

Figure 8A:
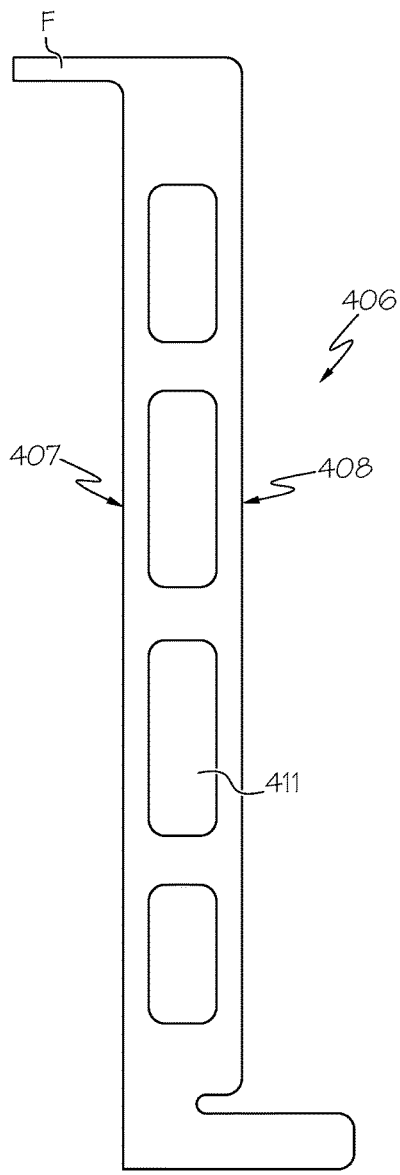
FIGS. 8A and 8B show two notional alternative edgewise profiles of the preform of FIG. 4, including a thicker profile with open channels formed therein (FIG. 8A) and a thinner profile without (FIG. 8B) such channels.
Figure 8B:
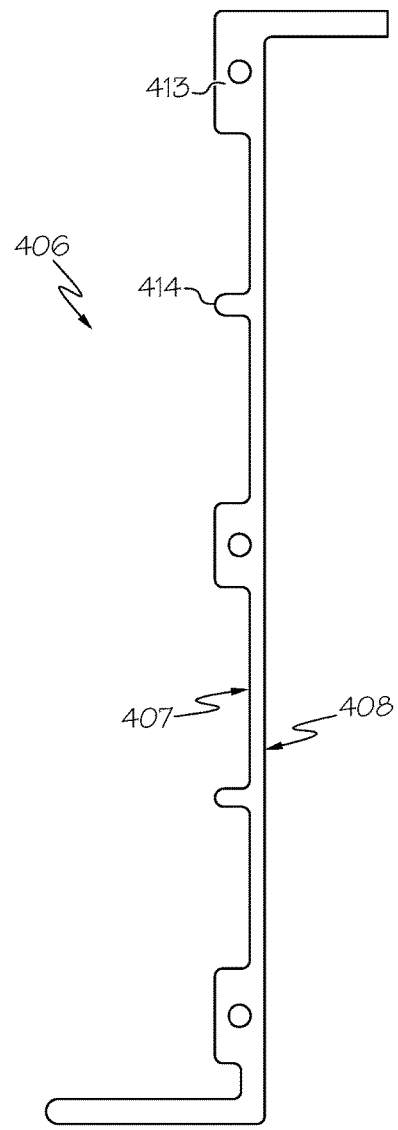

Referring to FIGS. 8A and 8B in conjunction with FIG. 4, two different variants of the extrusion that make up preform 406 are shown. In the variant shown with particularity in FIG. 8A, the preform 406 is thick enough that open channels 411 may be integrally formed therein between the opposing surfaces 407, 408. Such channels could be used to promote weight reduction or the introduction of cooling fluid in situations where a thicker, more structurally robust wall 412 is needed. In the variant shown with particularity in FIG. 8B, integral bosses 413 for threaded screw holes may be formed to extend outward from the edges of the preform 406, while periodically-spaced stiffeners 414 can be made to project form one or both sides 407, 408. In either variant, flanges F may be integrally formed at either or both the top and bottom edges of the preform 406. The choice of which variant is more suitable to form wall 412 may be made on numerous design considerations, including weight, overall enclosure robustness or the like, so long as continuity between adjacently-formed panels is preserved as a way to promote enhanced isolation between the batteries or other sensitive electrical equipment that is housed within the enclosure 410.

Referring next to FIG. 9, a slide-in bottom is enabled with a slot that is made up of the aligned grooves G in the extruded vertical panels. By contributing to a more modular enclosure 410 design, features such as a slide-in tray 420 help reduce design and engineering time to develop a new battery packs 400 when vehicle 100 configuration changes. This in turn enables the use of very low cost tooling, as well as reductions in computer-aided engineering (CAE) modeling and validation time. Significantly, the present invention makes it possible for the majority of the battery pack 400 components to be pre-assembled to the tray 420 then slid in to the mostly pre-folded enclosure 410, which can help improve the speed and ease of assembly.

It is noted that terms like "preferably", "commonly" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a battery or related source of electric power that in turn may be used to provide motive power. A device may also refer to a vehicle incorporating the source of motive power or other equipment that may make up, or be used in conjunction with, the vehicle or source of motive power; the nature of the device will be clear from the context. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context. Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An assembly comprising:
a plurality of prismatic batteries aligned along a stacking axis; and
an enclosure cooperative with the plurality of prismatic batteries to provide containment therefor, the enclosure comprising:
a tray defining a mounting surface thereon; and
an upstanding wall made from an extruded preform with periodically spaced miters that define a plurality of continuous panels therebetween that are formed upon corresponding bends made at the periodically spaced miters such that the panels are disposed along a plurality of tray peripheral edges and coupled thereto, the upstanding wall having sealed corners,
wherein the upstanding wall is an extruded preform including a plurality of elongate channels disposed between two opposing planar surfaces of at least two adjacent panels such that a continuous channel is formed upon bending the extruded preform and coupling the tray to a lower portion of the upstanding wall, and wherein the continuous channel is configured to receive cooling fluid flowed therethrough to cool the plurality of prismatic batteries within the enclosure.

2. The assembly of claim 1, wherein at least a majority of the panels further define a groove formed in the lower portion thereof to facilitate a slide-in engagement with the tray.

3. The assembly of claim 1, wherein the tray defines a substantially planar profile along at least a majority of its length such that the plurality of tray peripheral edges all reside within a substantially common plane.

4. The assembly of claim 1, wherein a stacking axis of at least a portion of the batteries is substantially parallel to an elongate dimension of the tray.

5. The assembly of claim 1, wherein the upstanding wall comprises an aluminum-based material.

6. The assembly of claim 1, wherein all of the plurality of panels surround the tray such that no more than one corner of the upstanding wall requires additional material to form a seal thereon.

7. The assembly of claim 6, wherein the additional material comprises at least one of an elastomeric sealant and a weld.

8. The assembly of claim 1, wherein at least one of the periodically spaced miters defines a relief notch formed therein such that upon the bending, material making up the panels that are adjacent the at least one of the periodically spaced miters does not form an interference fit.

9. The assembly of claim 1, wherein the upstanding wall comprises a plastic-based material.

10. A battery pack enclosure comprising:
a tray defining a mounting surface thereon; and
an upstanding wall with periodically spaced miters that define a plurality of continuous panels thereby, the plurality of continuous panels configured to bend at the periodically spaced miters and cooperative with the tray such that upon bending, the plurality of continuous panels are disposed along a plurality of tray peripheral edges, the upstanding wall defining a continuous structural seal at corners formed between at least a majority of adjacent ones of the plurality of continuous panels,
wherein the upstanding wall is an extruded preform including a plurality of elongate channels disposed between two opposing planar surfaces of at least two adjacent panels such that a continuous channel is formed upon bending the extruded preform and coupling the tray to a lower portion of the wall, and wherein the continuous channel is configured to receive cooling fluid flowed therethrough to cool a plurality of prismatic batteries within the battery pack enclosure.

11. The enclosure of claim 10, wherein the periodically spaced miters are all defined on one planar surface of the preform.

12. The enclosure of claim 10, wherein the periodically spaced miters are defined on both planar surfaces of the preform.

13. The enclosure of claim 10, further comprising a groove formed in the lower portion of the wall to facilitate a slide-in engagement with at least a portion of the tray.

14. A method comprising:
bending an extruded preform that includes miters formed therealong at the miters such that a plurality of continuous panels are created between bends formed at the miters to define an upstanding wall with sealed corners;
coupling a tray defining a mounting surface thereon to a lower portion of the wall such that an enclosure is formed by the wall and the tray; and
placing a plurality of prismatic batteries within the enclosure,
wherein the extruded preform includes a plurality of elongate channels disposed between two opposing planar surfaces of at least two adjacent panels such that a continuous channel is formed in response to bending the extruded preform and coupling the tray to the lower portion of the wall, and wherein the method further comprises cooling the plurality of prismatic batteries within the enclosure by flowing a fluid through the continuous channel.

15. The method of claim 14, wherein a groove is formed within the panels such that the upstanding wall defines a substantial planar interlock with peripheral edges formed in the tray.

16. The method of claim 14, further comprising sealing at least one joined location within the enclosure.

17. The method of claim 16, wherein the at least one joined location comprises at least one of (a) adjacent ends of the preform once the wall has been defined and (b) an interface formed between the tray and the wall.

18. The method of claim 17, wherein the sealing is achieved by at least one method selected from the group consisting of welding, bonding, riveting, screwing and bolting.

* * * * *